United States Patent
Boylan

[11] 3,736,012
[45] May 29, 1973

[54] CONNECTION JOINT FOR A CONCEALED CEILING SUSPENSION SYSTEM

[75] Inventor: Joseph W. Boylan, Lancaster, Pa.

[73] Assignee: Armstrong Cork Company, Lancaster, Pa.

[22] Filed: June 7, 1971

[21] Appl. No.: 150,401

[52] U.S. Cl..............287/189.36 A, 52/496, 52/668
[51] Int. Cl................................................F16b 7/04
[58] Field of Search..........................287/189.36 A; 52/668, 667, 496

[56] References Cited
UNITED STATES PATENTS

| 3,333,378 | 8/1967 | Jahn et al. | 52/496 X |
| 3,031,042 | 4/1962 | Drackett | 287/189.36 A |
| 3,189,138 | 6/1965 | Znamirowski | 287/189.36 X |
| 3,389,451 | 6/1968 | Speca et al. | 52/668 X |
| 3,640,042 | 2/1972 | Kidney | 52/496 X |

Primary Examiner—David J. Williamowsky
Assistant Examiner—Wayne L. Shedd
Attorney—Clifford B. Price

[57] ABSTRACT

The joint structure for connecting together the grid elements which form the suspension system for a concealed ceiling suspension system. A groove structure is provided in the cross members of the suspension system. This permits the cross members to be suspended from the main runners on the ceiling suspension system. Ceiling panels are then suspended from the cross members. The joint structure is specifically a generally inverted T-shaped groove in the vertical web of the cross member for receiving the generally inverted T-shaped structure of the main runner structure.

2 Claims, 3 Drawing Figures

Patented May 29, 1973 3,736,012
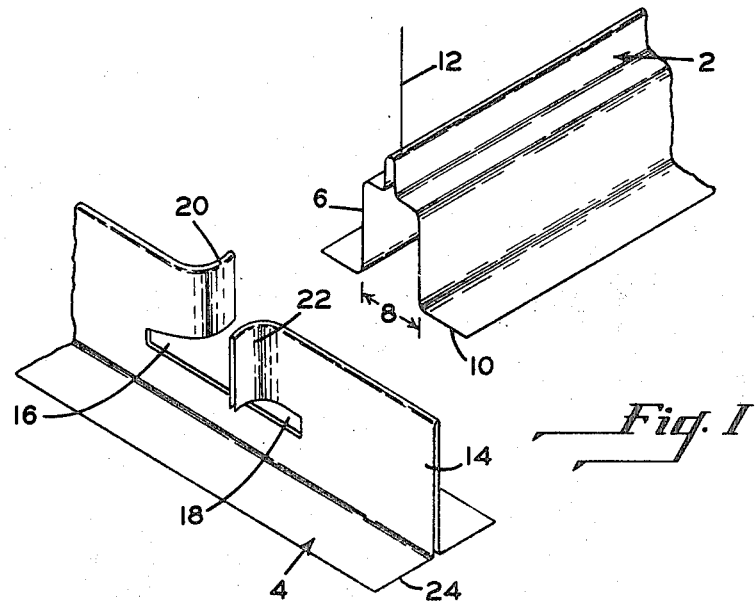
Fig. I
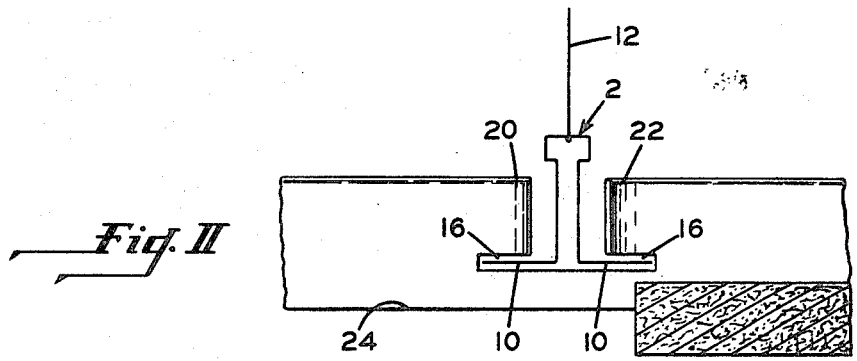
Fig. II
Fig. III
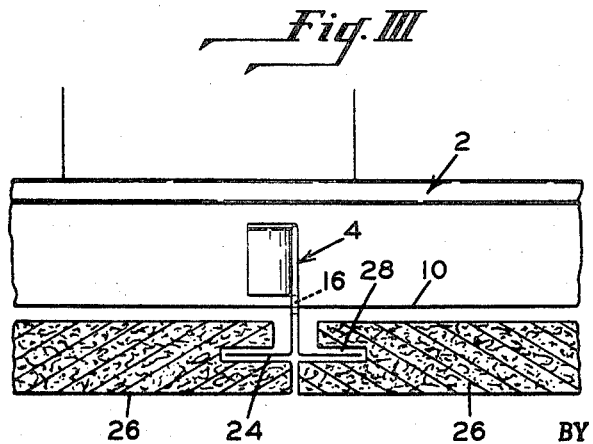
INVENTOR
JOSEPH W. BOYLAN
BY
ATTORNEY

CONNECTION JOINT FOR A CONCEALED CEILING SUSPENSION SYSTEM

BACKGROUND OF THE INVENTION

1. Field of the Invention

The invention is directed to a ceiling suspension system for concealed use application and, more particularly, to a joint structure for connecting together the elements of the suspended ceiling system.

2. Description of the Prior Art

A concealed joint suspension system is shown in U. S. Pat. No. 2,499,278. Herein clips are used to fasten together the different elements of the ceiling suspension system. U. S. Pat. No. 2,689,630 is a further showing of the types of joint structures which were normally used to fasten together the grid suspension system of a ceiling. Ceiling suspension systems are old and so likewise are concealed suspension systems for ceiling panels. Normal ceiling systems require the use of connecting members to connect together the series of elements which form the suspended ceiling system.

U. S. Pat. No. 3,540,179 indicates that grid structures can be assembled without the need of connecting members. This is carried out by passing one member through another and using the spring action of the one member passing through the other to hold the two members together. Such a feature has not been applied to concealed ceiling suspension systems.

SUMMARY OF THE INVENTION

The main runner system of the ceiling suspension system is fastened by wires to the overlying ceiling structure of the building. The main runner structures extend all parallel to each other at an appropriate spacing apart. Extending perpendicular to the main runner structure, there is provided a series of cross members upon which the actual ceiling panels or tile are supported. The support flanges for the cross members fit into kerf structures in the ceiling panels or tile and support these panels or tile in position in the ceiling region. For simplicity of construction, the vertical web of the cross member is provided with a T-shaped groove into which may be slid the structure of the main runner. Thus, the main runner is able to carry the cross member and the cross member may be adjusted to any location along the main runner.

The structure is extremely simple to put together and does not require any complicated tooling or adjusting of the runner structure to fasten it together. The structure is specifically designed for the home handyman so that he may rapidly put up a ceiling structure with the minimum of specialized tooling and knowledge.

BRIEF DESCRIPTION OF THE DRAWING

FIG. 1 is a perspective view of the main runner and cross member in an exploded view;

FIG. II is a side view of the assembled runner structure and a ceiling panel; and FIG. III is a general side view of the construction of FIG. II.

DESCRIPTION OF THE PREFERRED EMBODIMENT

In FIG. I there is shown an exploded perspective view of the main runner structure 2 and the cross member 4. The main runner structure is generally an inverted T-shape and in the embodiment shown in FIG. I it has a generally resilient wall structure 6 which may be squeezed in opposition to the arrows 8 and after the squeezing pressure is released, will snap back in the direction of the arrows 8. The flange structures 10 constitute the cross portion of the inverted T-shape. It is on these flange structures 10 that the cross member assembly 4 is mounted. A wire assembly 12 is used to fasten the main runner assembly to a ceiling structure of the building.

The cross member 4 has a vertical web 14 in which there is provided a slot structure 16 to receive the inverted T-shape of the main runner assembly 2. The slot structure 16 is formed by basically cutting a T configuration in the vertical web to provide a slot 18 which is generally parallel to the plane of the ceiling system and a slot which extends from the center of the slot 18 perpendicular to the upper edge of the vertical web. This then permits the two tab structures 20 and 22 to be bent out from the plane of the vertical web in the manner as shown in FIG. I. The cross member may now be mounted to the main runner member 2 by either having the main runner member slide through the slot structure 16 of the cross member or by having the wall structure 6 of the main runner assembly squeeze together so that the flanges 10 may be positioned between the two tabs 20 and 22 and then the releasing of the wall structure 6 to permit the flanges 10 to snap into the slots 18 of the cross member 4. Consequently, the above assembly may be either assembled by sliding the two elements together or by squeezing the one element and slipping it into the second element.

In FIG. II there is shown the assembled structure of the cross member 4 and the main runner assembly 2. The wire 12 is what is used to fasten the main runner 2 to the overlying ceiling structure of the building proper. The two flanges 10 are in the groove or slot 16 and thus permit the cross member 4 to be supported from the main runner 2. The tab structures 22 and 20 could be slightly bent towards the vertical web of the main runner to secure a little tighter joint connection. However, this feature is not necessary and the tabs could be normally left into their bent-out position. It should be noted that the slot 16 is spaced from the flange structure 24 of the cross member, which flange structure is inserted into the kerf structure of the ceiling panel to support the ceiling panel. The spacing of the slot 16 relative to the flange 24 is necessary to permit the ceiling panel to slide in under the flange 10 of the main runner assembly.

Referring now to FIG. III, there is shown this above relationship. The ceiling panels 26 are provided with kerf structures 28 which are placed upon the flanges 24 of the cross member structure. Since the cross member runs at a right angle to the main runner, the spacing between the slot 16 and the flange 24 is necessary to permit the ceiling panels 26 to slide under the flanges 10 of the main runner members 2.

It is noted that in the showing of FIG. II and III, there is shown a slight modification of the cross section of the main runner assembly 2. Here the structure is basically a simple T without the provision of the spring action to the side 6. This assembly can only be assembled to the cross member assembly by sliding the inverted T of the main runner through the slot of the cross member.

What is claimed is:

1. A runner assembly for a ceiling suspension system which provides for a concealed runner assembly holding ceiling panels in position below relative to the main structural ceiling of a building, comprising a main runner structure which is generally an inverted T-shape having flanges in a common plane, a cross member structure which is also a generally inverted T-shape having flanges in a common plane, the flanges of the cross member structure extending generally in the plane of the finished ceiling system and being spaced a distance below plane containing the flanges of the main runner structure, the cross member structure having a vertical web structure which extends from its flange structure, an inverted T-shaped slot being cut in the vertical web of the cross member structure to receive the inverted T-shaped configuration of the main runner structure and ceiling panels provided with a kerf structure in the edge thereof for receiving the flanges of the cross member structure to thus hold the ceiling panels in position in the suspended ceiling system, with the backs of the ceiling panels below the plane of the flanges of the main runner structure.

2. The structure of claim 1 wherein the vertical web structure of the main runner assembly is provided with spaced generally resilient yieldable wall structures so that the flanges of the main runner structure may be moved together to permit the flanges to be slipped into the slot in the vertical web of the cross member structure to provide a friction fit between the main runner structure and the cross member structure.

* * * * *